Aug. 17, 1937.                H. BANY                  2,090,524
                          REGULATING SYSTEM
                         Filed July 30, 1936
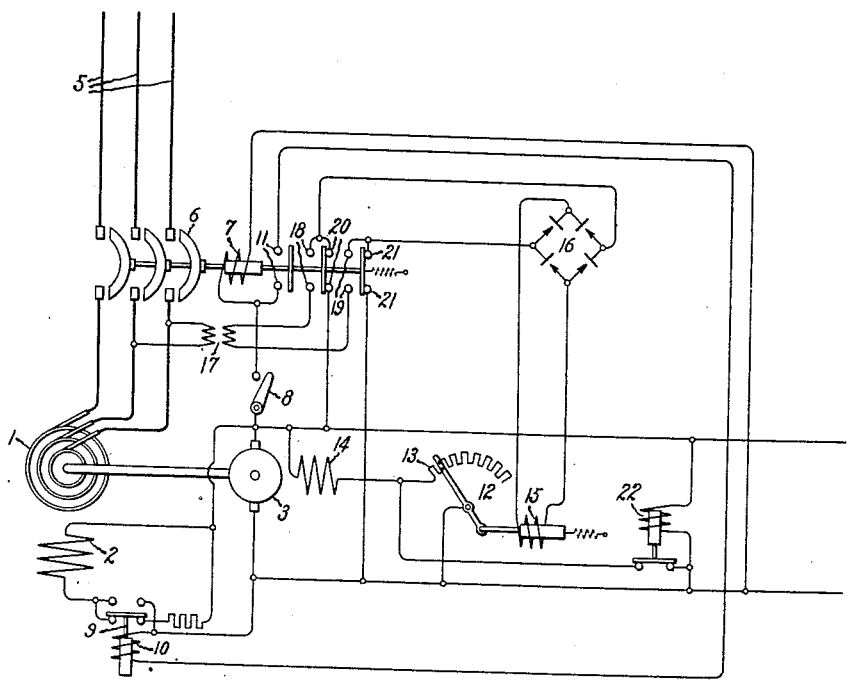
                                        Inventor:
                                      Herman Bany,
                                  by  Harry E. Dunham
                                        His Attorney.

Patented Aug. 17, 1937

2,090,524

UNITED STATES PATENT OFFICE 2,090,524

REGULATING SYSTEM

Herman Bany, Lansdowne, Pa., assignor to General Electric Company, a corporation of New York Application July 30, 1936, Serial No. 93,410

7 Claims. (Cl. 171—118)

My invention relates to regulating systems and particularly to a system for regulating the excitation of an exciter so that the exciter can also be used as a source of control current, and one object of my invention is to provide an improved regulating system for accomplishing this result.

In order to save the expense of a battery, it is common practice in automatic generating plants to use the direct-connected exciter as a source of control current. When, however, such an arrangement is used with a generator voltage regulator which has no means for controlling the exciter voltage under abnormal voltage conditions, I find it necessary to provide suitable means for maintaining the exciter voltage within predetermined limits under such abnormal operating conditions, such, for example, as during the starting operation of the automatic plant when the generator is disconnected from the load circuit and the generator voltage is zero since its field winding is unexcited. In accordance with my invention, I provide an arrangement for controlling the connection of the regulating winding of the regulator on the exciter so that during the starting and before the generator is connected to the load circuit, the regulating winding is energized in response to the exciter voltage and after the generator is connected to the load circuit the regulating winding is energized in response to the generator voltage.

My invention will be better understood from the following description when taken in connection with the accompanying drawing, the single figure of which diagrammatically illustrates a regulating system embodying my invention, and its scope will be pointed out in the appended claims.

Referring to the drawing, I represents an alternating current synchronous generator having a field winding 2 which is arranged to be supplied with current from a suitable source of direct current, such as an exciter 3 direct-connected to the generator 1. Any suitable driving means, examples of which are well-known in the art, may be provided for driving the generator 1 and the exciter 3.

The generator 1 is arranged to be connected to an alternating current load circuit 5 by means of a suitable switch 6 which may be of any well-known type, examples of which are well-known in the art. As shown in the drawing, the switch 6 is of the well-known contactor type and is provided with a closing coil 7, which is adapted to be connected across the terminals of the exciter 3. In order to simplify the disclosure, I have shown a hand switch 8 for completing the energizing circuit of the closing coil 7 across the terminals of the exciter 3, but it is to be understood, however, that any other suitable control means, either manually or automatically controlled in response to predetermined conditions of the generator 1 and the circuit 5, may be provided for controlling the switch 6.

The field winding 2 is arranged to be connected across the exciter 3 by means of a field switch 9, the operating winding 10 of which is arranged to be connected across the exciter 3 by the switch 8 and the auxiliary contacts 11 on the switch 6 when these switches are both closed.

In order to regulate the voltage of the generator 1 so as to maintain it at a predetermined value while the generator is connected to the load circuit 5, I provide an automatic voltage regulator 12 comprising an adjustable resistor 13 connected in series with the shunt field winding 14 of the exciter 3 and a regulating winding 15, which is arranged to adjust the amount of resistance connected in the exciter shunt field circuit directly as the voltage applied to the regulating winding varies. When the circuit breaker 6 is closed, the auxiliary contacts 18 and 19 connect the voltage regulating winding 15 through a suitable full-wave rectifying device 16 to the secondary winding of a potential transformer 17, the primary winding of which is connected across one phase of the generator 1 so that the regulating winding 15 is energized in response to the generator voltage.

In order that the exciter voltage may be of proper value to close the switch 6 and the field switch 9 during the starting operation of the generator, at which time the generator is supplying no load and the field winding 2 is unexcited, I provide in accordance with my invention an arrangement for connecting the regulating winding 15 across the terminals of the exciter 3 under these conditions. This result is accomplished by the auxiliary contact 20 and 21 on the circuit breaker 6 so that when the circuit breaker 6 is opened, the regulating winding 15 and the rectifying means 16 are connected in series across the exciter terminals.

Also in order to insure that the voltage of the exciter is maintained at a sufficient value to keep the switches 6 and 9 closed under light load conditions after the plant has been placed in operation, I provide the voltage relay 22, which is arranged to short-circuit the resistor 13 when the exciter voltage is below a predetermined value.

The operation of the arrangement shown in the drawing is as follows: When the plant is started, the prime mover which drives the generator 1 is regulated so as to bring the generator up to synchronous speed and cause the shunt exciter 3 to build up its voltage to a predetermined value, which is maintained by the regulator 12, the regulating winding of which is connected at this time across the terminals of the exciter 3 by the auxiliary contacts 20 and 21 of the open circuit breaker 6.

When the conditions are such that it is desired to close the switch 6, the control switch 8 is closed to connect the closing coil 7 of the circuit breaker 6 across the exciter so that the unexcited generator 1 is connected to the load circuit 5. By closing its auxiliary contacts 11, the circuit breaker 6 completes through the closed control switch 8 an energizing circuit for the closing coil 10 of the field switch 9 to connect the field winding 2 across the exciter 3. By opening its auxiliary contacts 20 and 21 and closing its auxiliary contacts 18 and 19, the circuit breaker 6 also transfers the connection of the regulating winding 15 of the regulator 12 from the exciter 3 to the secondary winding of the potential transformer 17. Therefore, after the circuit breaker 6 is closed, the regulating winding 15 is energized in response to the voltage of the generator 1 so that the regulator 12 operates to control the excitation of the exciter 3 in such a manner as to maintain the generator voltage at a predetermined value. If at any time the load connected to the load circuit is decreased to such a value that the regulator 12 tends to decrease the exciter voltage below a predetermined value, the relay 22 closes its contacts to complete a short circuit around the resistor 13 and thereby increase the exciter excitation so as to restore the exciter voltage above this predetermined minimum value.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In combination, a generator, an exciter therefor, a load circuit, a switch for connecting said generator to said load circuit, means for regulating the voltage of said exciter including a regulating winding, and means controlled by said switch for energizing said regulating winding in response to the voltage of said exciter when said switch is open and in response to the voltage of said generator when said switch is closed.

2. In combination, an alternating current generator, a direct connected exciter, a load circuit, a switch for connecting said generator to said load circuit, voltage regulating means for said exciter including a regulating winding, a full-wave rectifier, and means controlled by said switch for connecting said regulating winding across said exciter when said switch is open and for connecting said regulating winding and rectifier in series with said generator when said switch is closed so that said winding is energized in response to the generator voltage.

3. In combination, a generator, a direct connected exciter, a load circuit, a switch for connecting said generator to said load circuit, and means controlled by said switch for regulating the excitation of said exciter in response to the voltage of said exciter when said generator is disconnected from said load circuit and in response to the voltage of said generator when said generator is connected to said load circuit.

4. In combination, a generator, a direct connected exciter, a load circuit, a switch for connecting said generator to said load circuit, means controlled by said switch for regulating the excitation of said exciter in response to the voltage of said exciter when said generator is disconnected from said load circuit and in response to the voltage of said generator when said generator is connected to said load circuit, and means for maintaining the exciter voltage above a predetermined minimum value.

5. In combination, an alternating current generator, a direct connected exciter having a shunt field winding, an adjustable resistor in series with said field winding, an operating magnet for adjusting said resistor, a load circuit, a switch for connecting said generator to said load circuit, and means controlled by said switch for energizing said operating magnet in response to the exciter voltage when said switch is open and in response to the generator voltage when said switch is closed.

6. In combination, an alternating current generator, a direct connected exciter having a shunt field winding, an adjustable resistor in series with said field winding, an operating magnet for adjusting said resistor, a load circuit, a switch for connecting said generator to said load circuit, means controlled by said switch for energizing said operating magnet in response to the exciter voltage when said switch is open and in response to the generator voltage when said switch is closed, and means responsive to the voltage of said exciter for short-circuiting said adjustable resistor when the excitor voltage is below a predetermined value.

7. In combination, a generator, an exciter therefor, means for regulating the excitation of said exciter including a regulating winding, and switching means for connecting said regulating winding to said exciter so that said winding is energized in response to the exciter voltage under predetermined operating conditions of said generator and for connecting said winding to said generator so that said winding is energized in response to the generator voltage under other predetermined operating conditions of said generator.

HERMAN BANY.